United States Patent [19]
Bennett

[11] Patent Number: 5,550,359
[45] Date of Patent: Aug. 27, 1996

[54] TIME AND ATTENDANCE SYSTEM AND METHOD THEREFOR

[75] Inventor: Michael J. Bennett, Las Vegas, Nev.

[73] Assignee: Mikohn Gaming Corporation, Las Vegas, Nev.

[21] Appl. No.: 306,302

[22] Filed: Sep. 14, 1994

[51] Int. Cl.$^6$ .................................................. G06K 5/00
[52] U.S. Cl. ........................................ 235/382; 235/380
[58] Field of Search ............................... 235/382.5, 382, 235/380, 375

[56] References Cited

U.S. PATENT DOCUMENTS

| | | | |
|---|---|---|---|
| 3,564,132 | 2/1971 | Baker et al. | 178/6.8 |
| 3,997,723 | 12/1976 | Sandin | 178/7.8 |
| 4,804,829 | 2/1989 | Jacobsen | 235/377 |
| 4,821,118 | 4/1989 | Lafreniere | 358/108 |
| 5,027,401 | 6/1991 | Soltesz | 380/54 |
| 5,056,141 | 10/1991 | Dyke | 380/25 |
| 5,065,001 | 11/1991 | Hennick | 235/435 |
| 5,140,145 | 8/1992 | Bianco | 235/462 |
| 5,266,780 | 11/1993 | Kamata et al. | 235/375 |
| 5,285,384 | 2/1994 | Gineris | 364/408 |
| 5,337,358 | 8/1994 | Axelrod | 380/23 |

Primary Examiner—Donald T. Hajec
Assistant Examiner—Karl Frech
Attorney, Agent, or Firm—Dorr, Carson, Sloan & Birney, PC

[57] ABSTRACT

A system and method for rapidly recording employee time and attendance information. A user identification document is provided which contains identification information in the form of a bar code. The user places the document in a three-dimensional scanning region of a reader which scans the bar-coded information. The system is also designed to record a video image of the user as the bar code is scanned. The system may additionally require the user to input additional information in the form of a password or access code. The reader temporarily stores the information and sends confirmation to the user that the information has been successfully recorded. A host computer, connected to the reader and a plurality of other readers, periodically polls the reader. Upon polling by the host computer the reader transmits all information stored in its memory to the host computer where the information is stored in a database for subsequent analysis. The host computer may additionally be connected, along with a plurality of other host computers, to a central computer capable of retrieving and analyzing information from all host computers.

18 Claims, 6 Drawing Sheets 5,550,359

TIME AND ATTENDANCE SYSTEM AND METHOD THEREFOR

BACKGROUND OF THE INVENTION

1. Field of the Invention

The present invention relates to a system and method of recording employee time and attendance information and, more particularly, to a high-speed system and method using bar-coded identification documents in a computerized system.

2. Statement of the Problem

Many organizations, casinos, for example, employ thousands of employees who work in shifts. At the beginning of these shifts these employees are required to register their arrival in order for the employer to measure the number of hours worked. At the end of each shift these employees then register their departure. Typically, this registration has been done by marking a card with an inked stamp, thereby registering the time of arrival and departure on a conventional time card. This procedure is slow and can lead to substantial delays when several hundred or several thousand employees must each record their time of arrival and departure at a given starting and exiting time. There are also delays in processing the time and attendance information due to the fact that employees record their times at multiple time and attendance stations. A need currently exists to rapidly process a large number of employees registering their arrival or departure at a given time and at multiple entrances.

In addition to problems with delays, problems also exist with the security of this system. Because there is typically no way to confirm the identity of the individual actually punching the time card, it is possible for individuals other than the employee to use that employee's time card, allowing the employee to be credited for work done when the employee was actually not present. This problem is especially critical when dealing with a large number of employees entering or leaving work at a given time. A further need exists to provide a system of processing employees, especially large numbers of employees, at a given time wherein the identity of the person punching the time card is recorded.

Recent years have seen the development of magnetic stripe and bar code readers that require the user to move an identification (ID) card through a narrow slot with a constant downward motion past a read head. However, a false reading would result if constant speed during the "swipe" was not maintained. Also, the system would not notify the user of a false reading or give confirmation that the information on the card had been recorded. As a result, the user would be unaware of whether the system had made a valid reading or a false one. The user either would not attempt to repeat the "swipe" or would repeat multiple times to increase the chances that a valid reading had been made.

Another problem faced by these systems is that the narrow slot through which the ID card is passed requires the ID card and the slot to be in contact with each other. This physical contact would, after repeated use, cause the cards and the read heads to wear, resulting in maintenance and/or replacement costs.

Finally, current systems fail to address the needs of employees who forget their identification document. Without an identification document, the employee would not be able to record his or her arrival or departure at work without taking time to notify a supervisor with authority to record that employee's time and attendance without an identification document.

A need exists for a system and method for processing thousands of employees quickly. A further need exists for verifying that the person using a document is truly the person owning the document. A further need exists to allow an employee to record time and attendance without having an identification document. A final need exists for a system that does not require accuracy on the part of a user while the system enters data from a document card.

3. Patent Search

A patent search directed to the teachings of the present invention resulted in the following patents.

U.S. Pat. No. 4,804,829, to Jacobsen, presents a data-handling terminal including a microcomputer and memory. The terminal requires a mechanical feed of time cards with bar-coded information which are carefully fed through a path to be read. This system does not solve the problem addressed above that occurs when time cards are required to physically touch the reading device. It is also slow because the machine, not the user, feeds the card through the path to be read.

U.S. Pat. No. 5,266,780, to Kamata et al., is addressed to a human error preventing system, not a system for recording time and attendance information. Although it uses a bar code reader to read information, the system requires the user to operate the bar code reader by passing the reader over the bar-coded information. Again, this is a slow process due to the requirement of having the user hold and operate the reader.

U.S. Pat. No. 5,285,384, to Gineris, relates to a system and method for isolating and automating the transfer of tax withholdings to the appropriate tax withholding account. It uses optical scanning to scan documents. Gineris limits the system to payroll checks and the information in bar code form to information identifying particular withholding accounts. However, Gineris does not specifically address the needs involved where large numbers of employees are required to register their time using a physical document. Gineris especially does not meet the security needs of a time and attendance system where the system must be able to confirm the identity of the person using the identity document.

4. Solution to the Problem

For the foregoing reasons, there is a need for a system to record employee time and attendance information using bar-coded identification (ID) badges and/or cards which provides greater speed, greater security, and easier operation for the user of the system. The present invention is capable of entering time clock information for hundreds and thousands of employees quickly, when those employees are registering their time at multiple entrances. The current embodiment of the invention is capable of processing approximately five to six employees each minute at each reader.

The present invention does not require the user to swipe the document through the reader at a constant speed, thus minimizing problems with false reads when a constant speed is not maintained. Also, the present invention does not require the user to place the card carefully through a slot. It allows the user to place the card anywhere in a broad scanning region within which a valid reading can be obtained. This allows for readings to be taken faster than prior methods and allows for fewer false reads.

The present invention also does not require physical contact between the reader and the user identification document. This eliminates problems in the prior methods with physical wear of both the reader and the user identification documents.

The present invention also sends visual and auditory confirmation of a valid reading to the individual user when a valid reading has been obtained.

In one embodiment of the present invention, a video image can be taken of the user of the identification document. This allows for greater security by providing for confirmation that the user of the identification document is the person identified by the card.

The present system similarly allows for greater security by providing for additional keyboard input whereby the user can be required to input additional password information in addition to information bar coded on the user identification document.

SUMMARY OF THE INVENTION

The present invention is directed to a system that satisfies the needs addressed above. A time and attendance system having features of the present invention comprises a plurality of user identification documents each containing information uniquely identifying the user of that document. This information appearing on the document may comprise: bar-coded information uniquely identifying the user, a photograph of the user, and typewritten information including the user's name. The system also provides a plurality of readers to scan the information on the identification document. A reader includes a memory for temporarily storing the scanned information and a display to convey information back to the user.

A reading device in the system further includes its own memory for locally storing the information provided by the user. It also includes a scanner for reading the bar-coded information from the user identification document. A three-dimensional reading area is provided. The user places the bar-coded information on the user identification card in this area to be read by the scanner.

A local clock also provides time and date information to record the time and date for each use by an employee. A local processor processes the user identification by comparing it to information stored in the storage means. The processor then provides a visual and auditory confirmation of a valid reading back to the user.

One embodiment of the reader includes a video camera for recording the image of each user as the system is being used. The image is temporarily stored in the reader's memory, paired with the corresponding information recorded from the user's identification card. This embodiment can also provide a keypad. This keypad can be used by the user to enter optional password or access code information in addition to or in substitution for the user identification card.

The system also provides a plurality of host computers, each connected to a plurality of readers. A host computer contains a database for storing and arranging the identification information, time and date information, and any other information to be specified by users of the system. When requested by the host computer, the reader will send validated identification information to the host computer for storage in the database.

A central computer is connected by a network to a plurality of systems located at different entrances to the job site and/or different job sites for processing, storing, and displaying the information.

DETAILED DESCRIPTION

1. Overview

Figure 1:
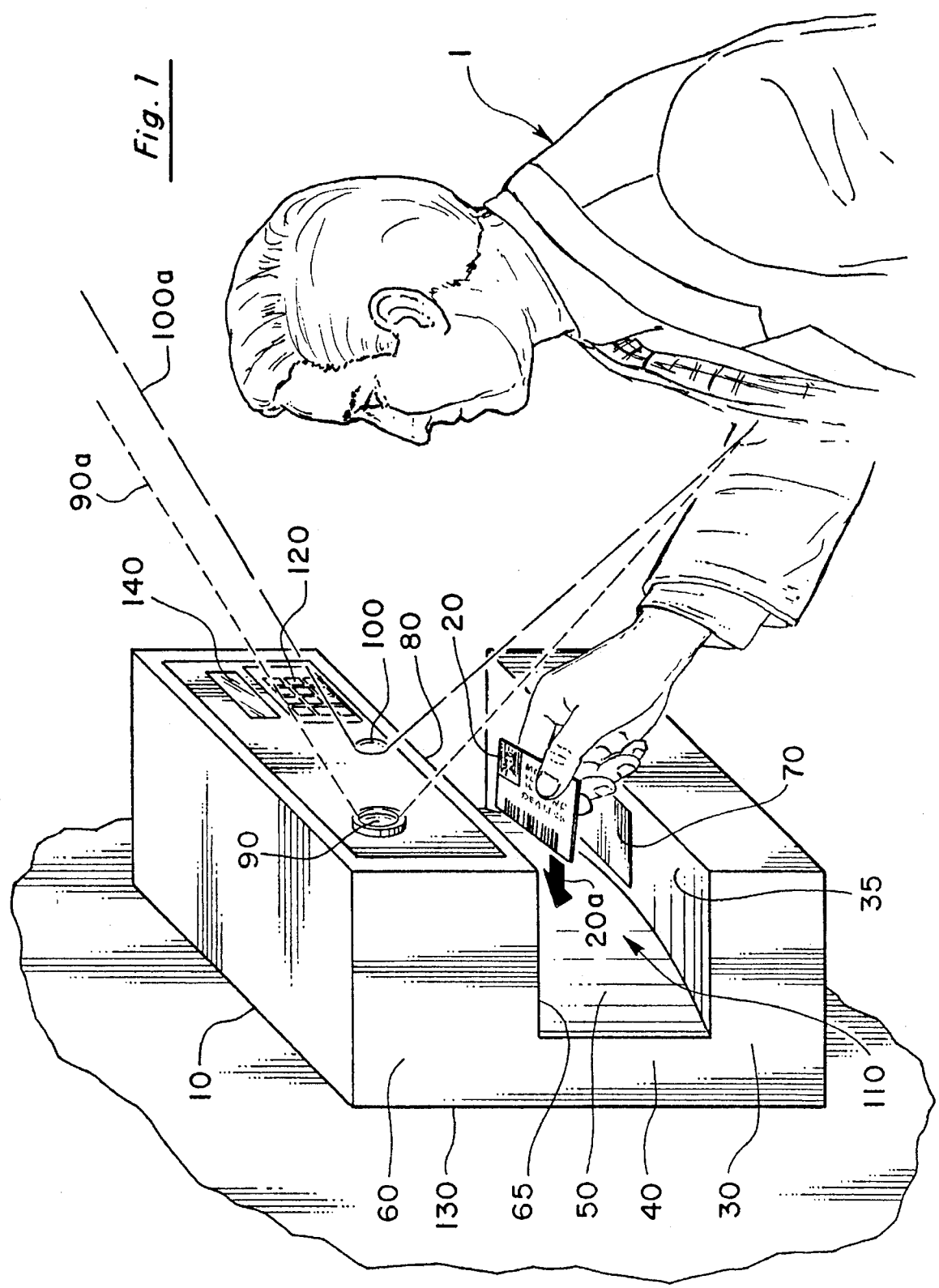
FIG. 1 is a perspective illustration showing a version of the present invention being used by a user.

FIG. 1 illustrates a reader 10 in the bar code time and attendance system of the present invention reading an identification document 20 being entered by a user 1, such as an employee.

The reader 10 is composed of a base 30 with a sample user document 70 on its upper surface 35 which aids in placement of the identification document 20 in the formed channel 110. Extended from the upper surface 35 of the base 30 is a support column 40 with an arcuate surface 50 facing the user 1. Attached to this column 40 is a an upper container portion 60 with a lower surface 65 facing upper surface 35. The upper surface 35, the arcuate surface 50, and the lower surface 65 of the upper container portion form a channel 110 into which a user 1 passes the user identification document 20. The container portion 60 contains the circuitry that controls the reader 10. The various elements of the reader 10 will be discussed below.

Each employee or user 1 of the system has a unique user identification document 20 which will be discussed below. At the beginning and end of each shift of work the user 1 uses the system to make a record of the time worked. The user 1 places his or her user identification document 20 in the reader 10 as shown in FIG. 1. This is done by sliding the document 20 forward into the channel 110, as shown by arrow 20a, to be scanned by the scanner 80. The document 20 is not required to come into physical contact with the reader 10.

A sample document 70 is provided on the upper surface 35 of the base 30 as a guide to the user 1. For the reader 10 to successfully read the information on the document 20, the user 1 should place the user identification document 20 in the three-dimensional scanning region 115 of the channel 110 generally over the sample document 70 as discussed below.

As the user 1 places the document 20 into the scanning region 115, the scanner 80 scans the bar-coded information on the document 20. The scanner 80 is a conventional portable laser scanner similar to those used to scan bar codes on goods in grocery or convenience stores. The scanner 80 is located in the upper container portion 60 above the channel 110. The scanner 80 is placed in the upper container portion 60 so that it projects the laser from the lower surface 65 downward toward the upper surface 35 with the laser aimed at the sample document 70. The scanner 80 will successfully read the bar code information when the bar code is passed through the beam of laser light.

There is also an optional video camera 90 that can be used in one embodiment of the invention. The video camera 90 can be used to record an image of each user 1 as the user inserts the user document 20 into the channel 110. The video camera 90 will record the image of the user 1 who comes within the field of view of the camera 90 as indicated by the field of view lines 90a. The video camera 90 adds a further level of security to the system. It helps prevent the phenomenon of the "phantom employee," persons who use someone else's user identification document 20 to credit the user identified by that document 20 for work not done or for work done by someone else. The video camera 90 in the current embodiment is incorporated directly into the internal circuitry of the reader by a digital video board. However, the video camera 90 can be a conventional stand-alone video camera. The video camera 90 may be used to record either color or black-and-white images, although in the current embodiment it is used to record lower-resolution black-and-white images.

FIG. 1 also shows an optional keyboard 120 that can be used for additional input. The keyboard 120 can add a level of security by requiring each user 1 to input a given password each time the card 20 is used. Alternatively, the keyboard 120 can allow a user 1 without a user identification document 20 to access the system with only a password. This would benefit employees who had lost or forgotten their personal user identification documents 20. Because each individual password would be unique to a given employee, the optional keyboard 120 does not sacrifice any of the security of the system, although it would be slower than using the system with the user document 20 alone.

A visual indicator 100 is a light 100a visible to the user 1. The light from the indicator 100 is projected in the direction of the user 1 as shown by the lines 100a. The indicator 100 serves to indicate to the user 1 that the system has successfully recorded the information on the user identification document 20 or keyboard 120. Additionally, it can serve to indicate that a successful image has been recorded by the video camera 90.

An optional auditory indicator is shown at 130. This indicator is in the form of a speaker built into the circuit board contained in the upper container portion 60. This indicator serves the same function as the visual indicator 100 but adds further feedback and confirmation to the user that the document 20 has been successfully read.

The reader 10 in FIG. 1 also contains a display 140. This is a liquid crystal alphanumeric display (LCD) that can be used for time-of-day and other system defined messages, for example, announcing a plant shut down for repair.

Figure 2:
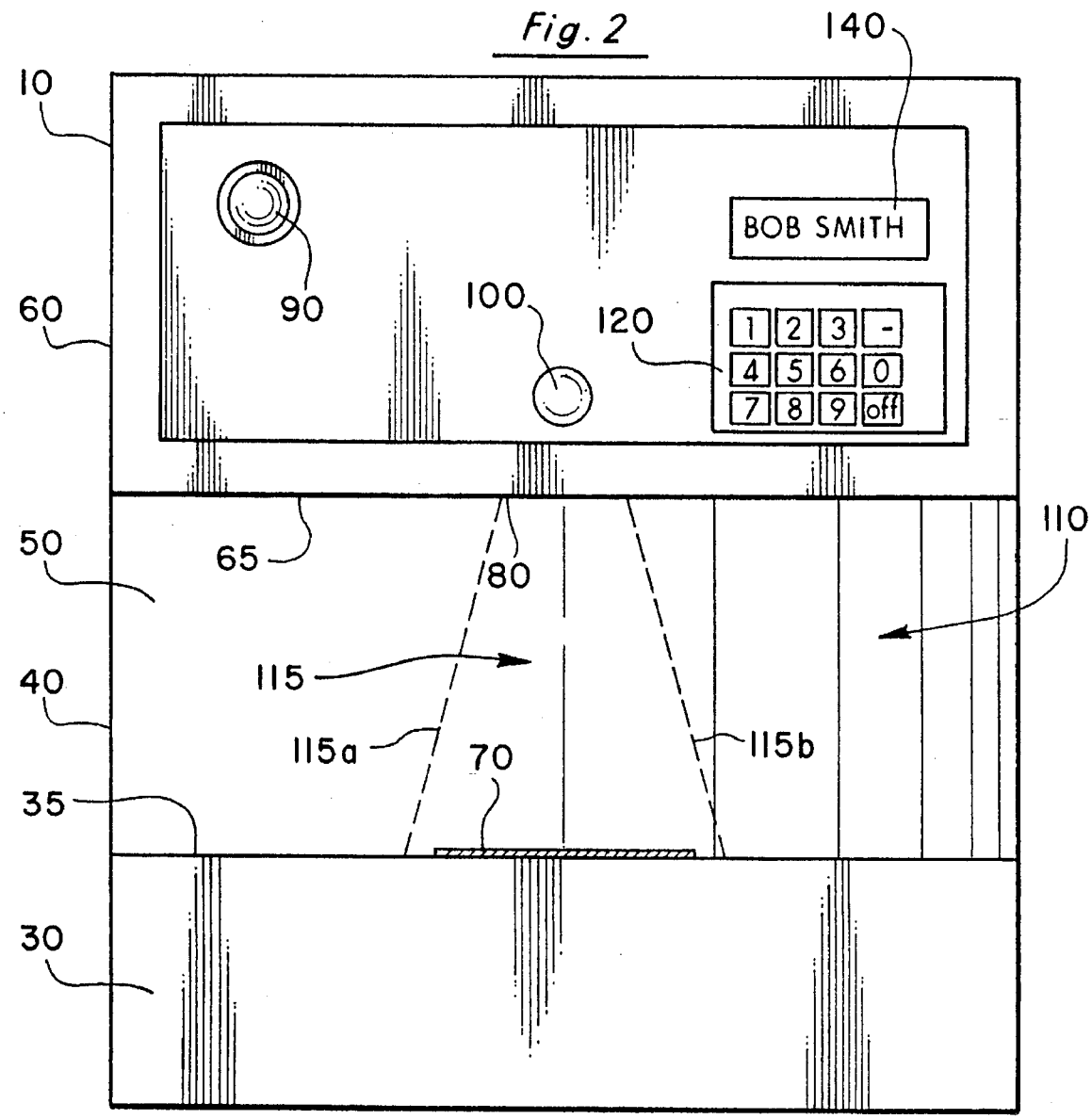
FIG. 2 is a front plan view of reader embodying features of the present invention.

FIG. 2 shows a frontal plan view of the reader 10 discussed above. The relationship between the scanner 80 and the sample user document 70 is shown in this view. A three-dimensional scanning region 115 is formed with the bottom of the scanning region being bounded by the upper surface 35 of the base, the top of the scanning region being bounded by the lower surface 65 of upper portion 60, and the sides of the scanning region, 115a and 115b, being bounded by the projected laser light from the scanner 80.

The scanner 80 projects a beam of laser light downward through the three-dimensional scanning region 115 toward the sample document 70. The system will successfully read the bar code on a user document 20 if the bar code passes into scanning region 115 through the path of the laser beam. The present embodiment allows the user 1 an approximately three-inch margin of error in relation to the sample document 70. The three-dimensional scanning region 115 in the present embodiment extends approximately three inches beyond the perimeter of the sample document 70. As long as the user 1 places the user identification document 20 within this scanning region, the scanner will be able to scan the bar code on the identification document 20.

Figure 9:
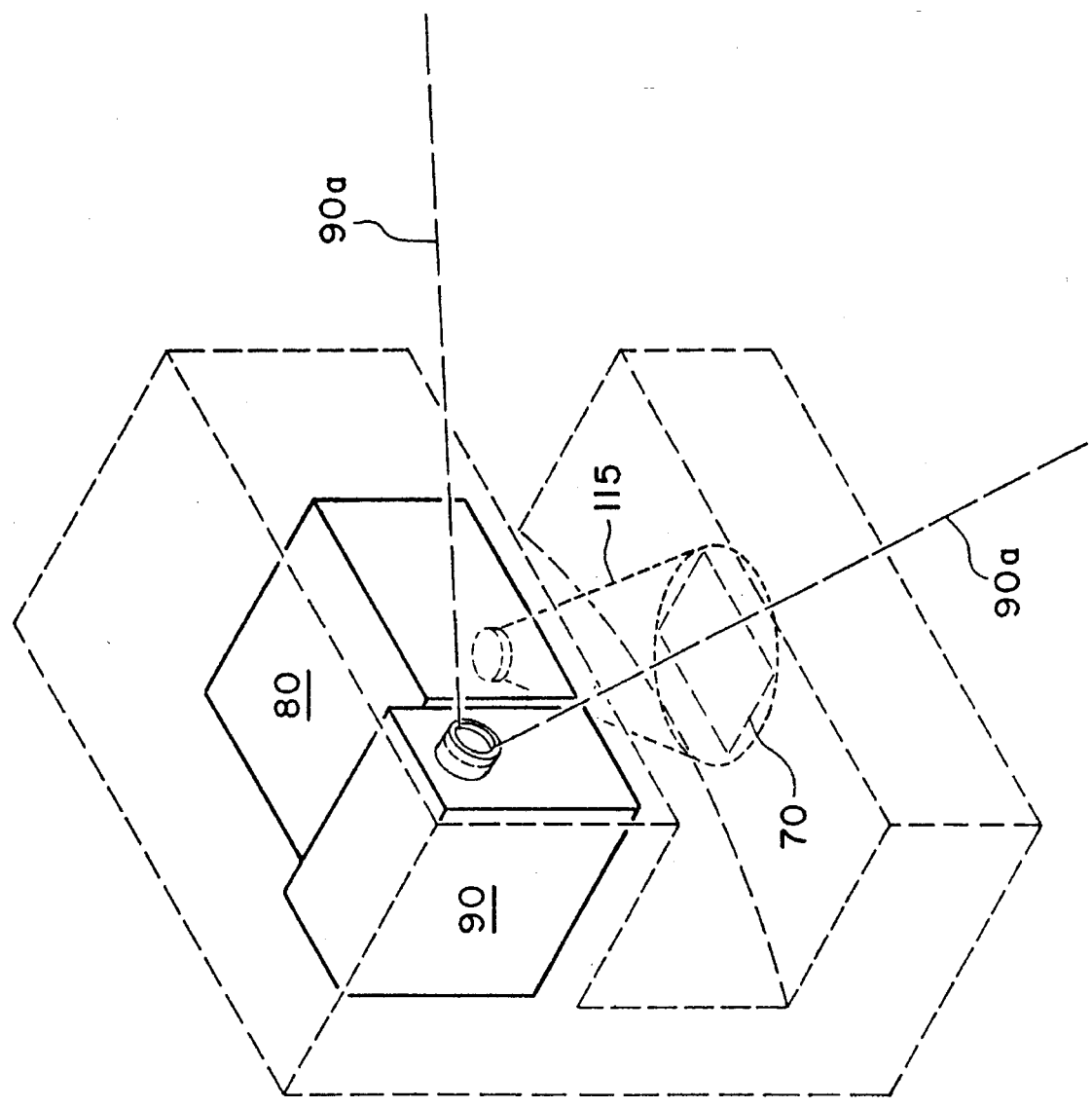
FIG. 9 is a perspective illustration showing the video camera and laser scanner inside the reader.

FIG. 9 shows a view of the interior of the reader 10. The video camera 90 and scanner 80 are shown. The field of view 90a of the video camera is shown. Also, the three-dimensional scanning region 115 is shown, indicating the scanning region into which the user 1 places the user identification document 20.

Figure 3:
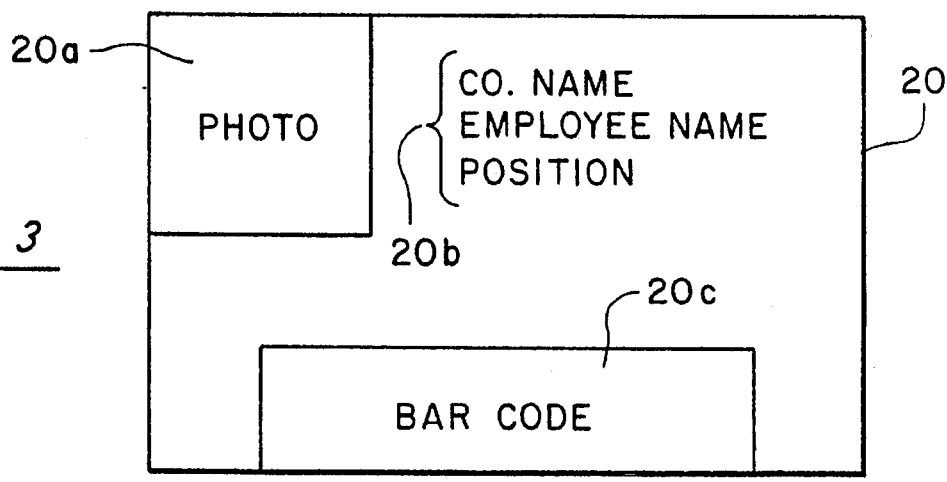
FIG. 3 is a front plan view of a user identification document embodying features of the present invention.

In FIG. 3 an example of a user identification document 20 is shown. This embodiment shows the document 20 in the form of a small plastic card such as a credit card or driver's license, approximately 2 inches by 3.5 inches in size. The drawing also shows information that may be placed on the document. The document 20 may contain a photograph 20a of the user identified on the document. Typewritten information 20b including the company name, employee name, and employee position may also be included. The only form of information that must be included is the bar code 20c shown at the bottom of the document 20. In its simplest form, the bar code 20c would encode only the password unique to the user 1 identified on the card 20. However, more information can be encoded as desired. The only physical restrictions on the document 20 are that the bar code 20c contained on the document 20 must be capable of being placed, bar code 20c facing up, under the scanner 80 to be read.

The current embodiment uses a card similar in size to a credit card, but other embodiments are equivalent. These include, for example, plastic identification bands worn on the user's wrist. Another suitable document might be a passport that includes bar-coded information. In general, any object that will fit into the channel 110 of the reader 10 and that has bar-coded information will be capable of functioning as a user document.

The structural components of the time and attendance system are shown in FIG. 1, FIG. 2, and FIG. 3. The user 1 of the system has a personal user identification document 20 in the form of a small card with bar code 20c information. The user approaches a reader 20 that contains a scanner 80 capable of reading the bar-coded information on the user document 20. The user 1 places the document 20 in the channel 110 of the reader 10 over the sample document 70 and underneath the scanner 80. If the scanner 80 successfully reads the bar code 20c information, then the reader 10 will give visual confirmation, 100 and 100a, and auditory confirmation 130 to the user 1 that the information has been successfully recorded. The user 1 can then commence work. The reader 20 is only a component of the overall time and attendance system and is integrated into the system as discussed below.

2. Detail of System Operation

Figure 4:
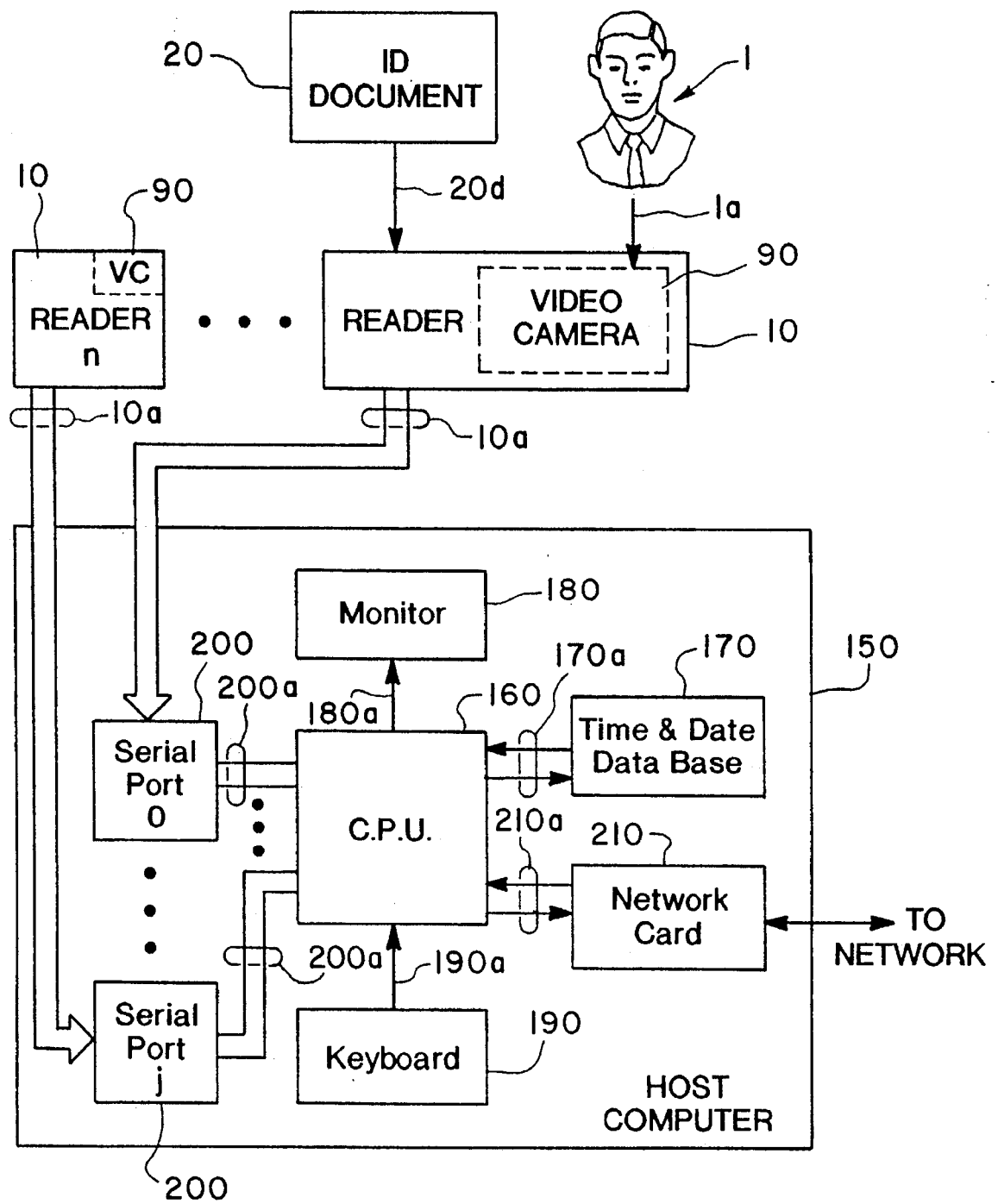
FIG. 4 is a block diagram of a time and attendance system according to the features of the present invention.

An overview of the time and attendance system of the present invention is shown in the block diagram of FIG. 4.

The user document 20 is shown being read by a reader 10 as illustrated by line 20d. An optional image of the user 1 may be obtained by a video camera 90 in the reader 10 as illustrated by line 1a. A host computer connected to the readers is shown at 150. Under the teachings of the present invention, at least one reader 10 is attached to the host computer 150. In this drawing "n" readers are shown, "Reader 0" to "Reader n". In the simplest version, only one or two readers 10 are attached to a host computer 150. However, in the present embodiment a single host computer 150 can act as host for up to sixty-four readers. It is understood that this number is not a limitation of the system and more readers can be added as needed by operators of the system.

A. Host Computer:

Each reader 10 is connected to the host computer 150 by a serial data port 200 over data bus lines 10a. The present embodiment uses an RS-485 multidrop serial data port for host computer communications. However, any similarly functioning serial data port will work as well. In this drawing "j" ports 200, "Serial Port 0" to "Serial Port j", are shown. It is to be understood that any suitable interconnection could be made, such as a parallel connection or a wireless connection.

The current embodiment of the time and attendance system uses an IBM-compatible '386 or '486 PC as a host computer 150. This is not meant to imply that other computers could not function in the system. Other computers such as Macintosh or Next would function equivalently. Similarly, the host computer 150 is not limited to any particular operating system.

The host computer 150 contains a standard keyboard 190 and monitor 180 connected over lines 180a and 190a. The central processing unit (CPU) 160 communicates with the readers 10 through the serial ports 200 over lines 200a. Each host computer 150 can also be attached to a network by a network card 210 over lines 210a.

The host computer 150 contains in its memory a time and date database 170. The preferred embodiment of the host computer will use a typical read-only-memory of the type found in an IBM-compatible PC. However, any type of memory capable of storing a database that can be updated should be equivalent. For example, digital tape drives or writable CD-ROM would function similarly.

The database 170 is used to record each use of a reader 10 by a user 1. The time, date, and identification information precisely corresponding to each use is also stored in the database 170 over lines 170a. The information in the database 170 is later used to calculate, for example, the number of hours worked by a given employee, how often an employee is late and/or missing work, and other conventional parameters. This can be done either in the host computer 150 or a central computer connected to the host computer 150 on the network.

In the present embodiment the database 170 will contain the password for each user 1 and will record the time and dates of attendance for the use of that password. This password is then matched with the corresponding user's name by an application program that calculates the wages based on that user's salary information.

Figure 5:
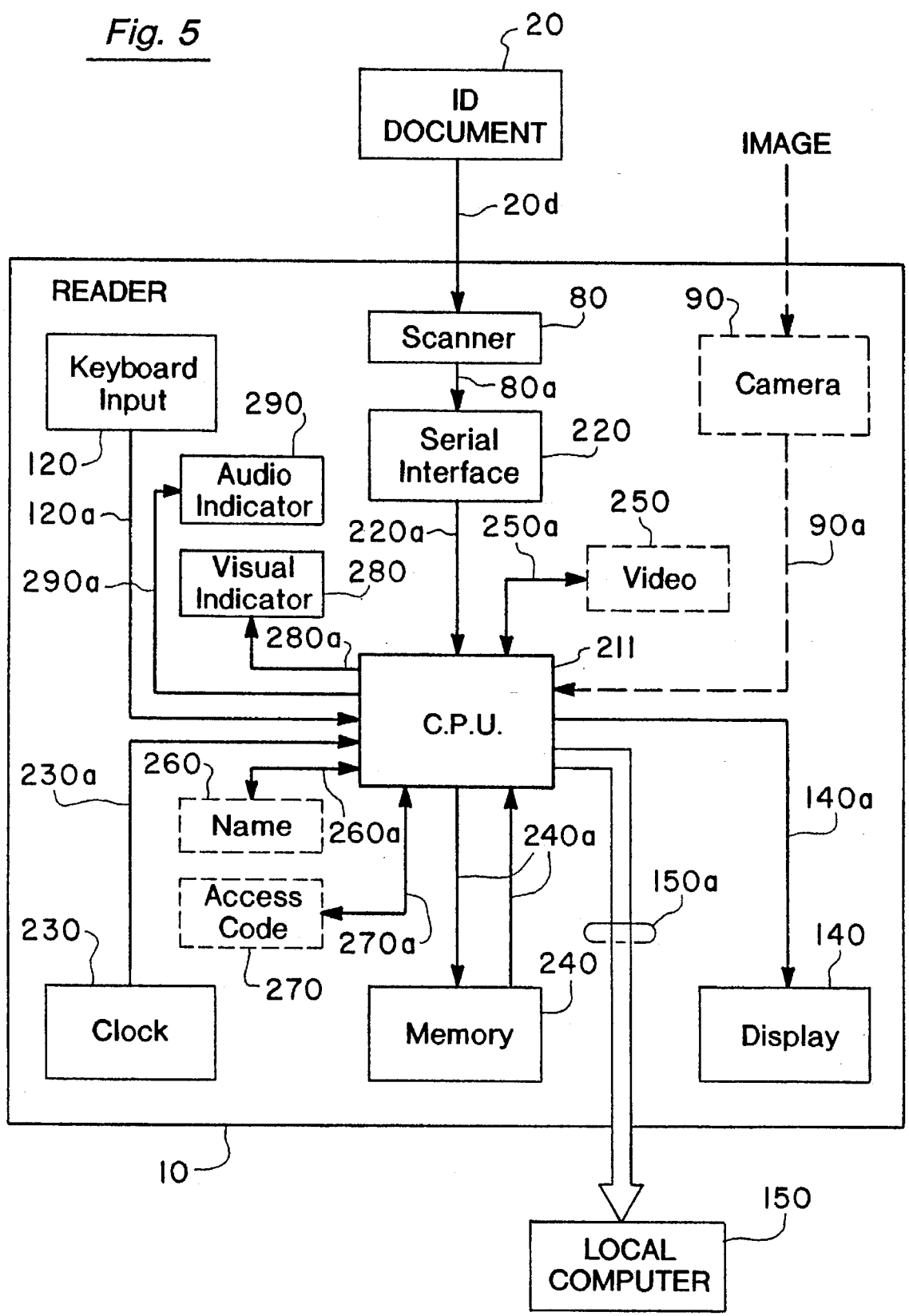
FIG. 5 is a block diagram of a reader according to the features of the present invention.

B. Reader:

A block diagram of a reader 10 is shown in FIG. 5. A user 1 inputs information on an identification document 20 to the scanner 80 at line 20d. In the present embodiment the scanner 80 is a conventional laser projection scanner unit capable of scanning bar codes. The present embodiment of the reader 10 is designed to use a portable laser scanner for reading bar-coded information. Any other device capable of recording or transmitting bar-coded information passed through the channel 110 of the reader 10 would equivalently function as a scanner 80.

The scanner 80 projects a laser beam downward, and when a document 20 with bar-coded information 20c is placed in the path of the beam, the scanner 80 reads the information encoded by the bar code 20c. The current embodiment of the invention allows the user 1 to scan a document 20 in approximately 2–3 seconds, although in practice in takes up to three times that long due to delays in each user 1 moving past the scanner. In practice, each reader 10 in the current embodiment will process approximately five to six users 1 each minute, or three hundred to three hundred and sixty users 1 each hour.

The scanner 80 is connected to a serial interface 220 at line 80a. In the present embodiment the serial interface 220 is an RS-232 serial interface. The serial interface 220 is further connected at line 220a to the CPU 211. When a bar code 20c passes under the field of view of the scanner 80, and a valid bar code is read, the bar code information is sent over line 80a to the serial interface 220 and then over line 220a to the CPU 211. The CPU 211 reads the serialized bar code data and sends the valid code over line 240a to a memory stack 240 where it is stored. The memory stack 240 in the current embodiment is a stack five hundred and twelve transactions deep, thereby temporarily storing up to five hundred and twelve employee identifications and arrival or departure times.

The CPU 211 in the present embodiment is an Intel 8051 processor and is further connected to a liquid crystal alphanumeric display (LCD) 140 over line 140a and data entry keypad 120 over line 120a. Although the CPU 211 in the reader 10 is designed in the present embodiment using an Intel 8051 processor, the current invention is not designed to be limited to this processor. Any equivalently functioning processor capable of processing digital bar code information would also function as well. Similarly, any display capable of displaying messages from the system would function equivalently. This could be provided, for example, on a television monitor.

The optional video camera 90 is also connected to the CPU 211 over line 90a. The video camera 90 is used to record images of each user 1 at the time of each use.

A clock 230 is shown that continuously updates the time and date. It sends this updated time and date information over line 230a to the CPU 211 on a periodic basis. The preferred embodiment of the reader 10 also uses a digital clock 230 built into the circuit board to provide current time and date information. The clock 230 is not limited to clocks built into the system. Equivalent function can be provided by external clocks connected to the CPU 211.

As a user 1 uses the system the CPU 211 receives the bar-coded information from the scanner 80. The CPU 211 matches the received information with the time and date and transmits this to the memory 240 over line 240a. In the embodiment with the optional video camera 90 the CPU 211 transmits the processed image over line 250a to the video memory 250 along with the corresponding time, date, and user identification information.

In other optional embodiments the reader 10 may contain a memory 260 that contains user names and a memory 270 that contains user access codes. The name memory 260 contains the names of all users corresponding to their access codes. The CPU 211 receives the password from the user 1 currently using the system. It then searches the name memory 260 over line 260a for the matching password. Upon a successful match, the CPU 211 retrieves the corresponding name from the name memory 260 over line 260a. This name can then be used, for example, to transmit a personalized message over line 140a to the display 140. This feature is important in addressing the needs of employees who forget their identification documents 20.

Another optional embodiment uses a memory 270 that contains access codes. This can be used when the user 1 is required to input an access code using the keypad 120 in addition to or in substitution for inputting information using the scanner 80. The CPU 211 will search the access code memory 270 for a match to the access code provided by the user by retrieving access codes over line 270a. If a successful match is found, then a confirmation signal is sent to the user 1 using the auditory indicator 290 over line 290a and/or the visual indicator 280 over line 280a.

The auditory indicator 290 is provided in the preferred embodiment by a speaker 130 built into the circuit board containing the CPU 211. Any other means of transmitting an auditory signal would be equivalent. The speaker 130 is not necessarily limited to one built into the circuit board. Also, the visual indicator 280 is in the form of a light that is switched on and off by the CPU 211 to indicate a confirmed reading of the user card 20. Any other form of visual indication would function equivalently.

Although the embodiment of the time and attendance system described above is the preferred one, other embodiments are contemplated.

3. Detail of the Method

Figure 6:
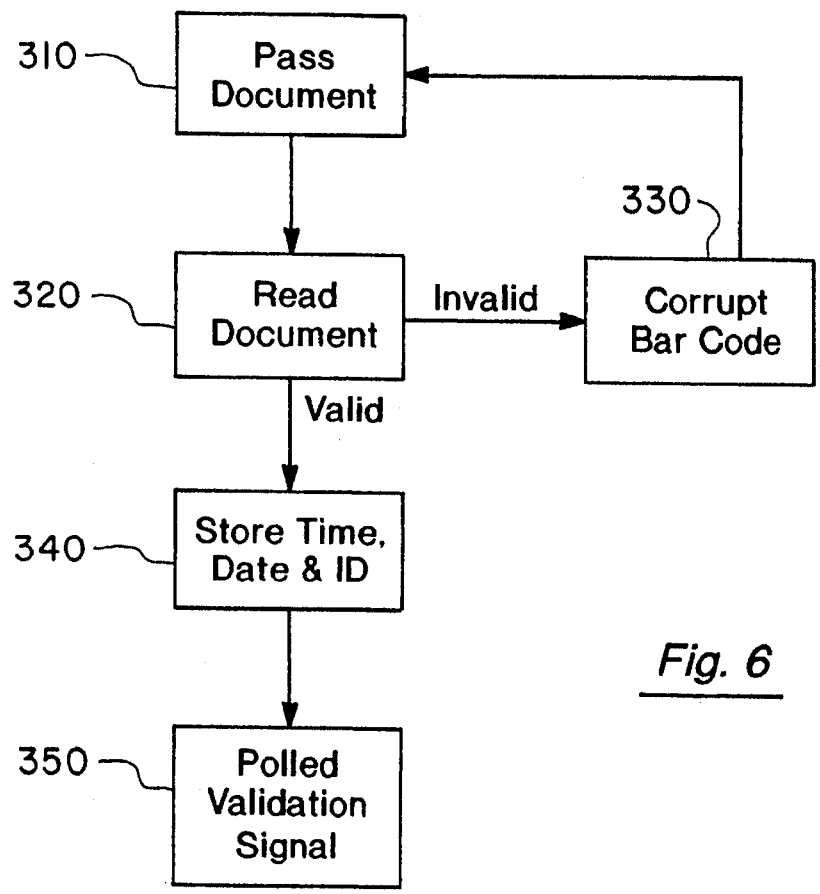
FIG. 6 is a flow chart diagram illustrating the operation of the time and attendance system of FIGS. 4 and 5 according to the features of the present invention.
Figure 7:
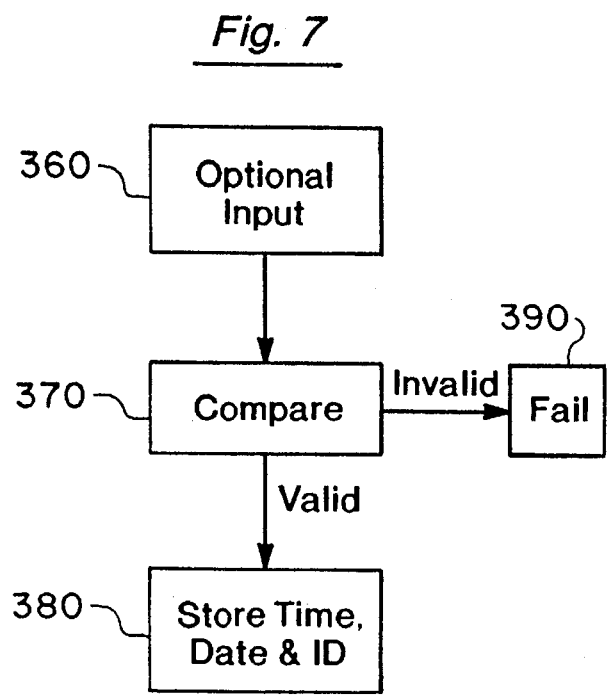
FIG. 7 is a flow chart diagram illustrating the operation of the time and attendance system of FIGS. 4 and 5 with optional security code input according to the features of the present invention.
Figure 8:
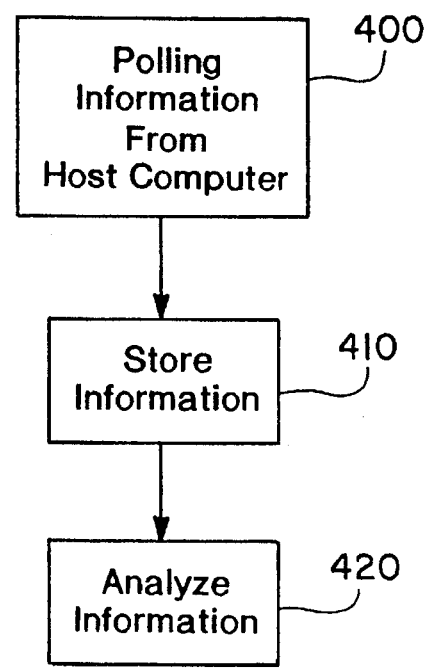
FIG. 8 is a flow chart diagram illustrating the transfer of information from the user input device when requested by the host computer according to the features of the present invention.

Operation of the time and attendance system is shown in the flow charts shown in FIG. 6, FIG. 7, and FIG. 8. Beginning in FIG. 6, the user 1 passes the user identification document 20 in the three-dimensional scanning region 115 under the scanner 80 at 310. The scanner 80 then reads the bar-coded information on the document at 320. If the bar code 20c contains invalid information or corrupted information, then the reader 10 fails to give a confirmation to the user 1 at 330. In this instance no information is stored in memory. The user 1 has the opportunity to repeat the pass under the scanner 80.

When the scanner 80 successfully scans the information, the information is passed on to the CPU 211. The CPU 211 then reads the current time and date information sent to it from the clock 230 and stores the current time and date and the scanned information in the memory stack 240 at 340. The CPU 211 then sends a confirmation signal to the user 1 through the visual and/or auditory indicators at 350.

The flow chart for an optional embodiment is shown in FIG. 7. Where the user is required to provide additional access information through the keypad at 360 the CPU 211 receives the access code. The CUP 211 then compares this to the access codes stored in the access code memory 270 at 370. If the CPU 211 fails at 390 to find a matching code in memory 270 due to the access code being invalid, then no confirmation is sent to the user 1, who must try to enter the information again. If the CPU 211 does find a successful match, it stores the time, date, and user information in memory 240 at 380.

FIG. 8 shows the transfer of information from the reader 10 to the host computer 150. The host computer 150 periodically polls each reader connected to it through a serial interface at 400. Upon polling, the CPU 211 in each reader 10 will retrieve all information on the memory stack 240 and transmit it to the CPU 211 in the host computer 150. The CPU 211 in the host computer 150 will then store the information in the time and attendance database 170 at 410. The host computer 150 can then further analyze the information at 420 by using an application program.

In summary, the preferred embodiment of the system is operated by passing a document containing bar-coded information under a bar code reading device. The bar code reading device records the bar code information and then transmits the information to a digital processor. The digital processor transmits the information, along with the current time and date, to a local digital memory. The digital processor then sends a visual indicator, auditory indicator, and optional message to the user of the system. The digital processor is periodically polled by a host computer. Upon polling, the digital processor transmits all the data stored in the local digital memory to the central processor of the host computer. The central processor in the host computer then transmits the information to a database contained in the memory in the host computer. There, the memory is stored to be used by various application programs to compute, for example, hours worked and wages earned.

Although the present invention has been described with reference to certain preferred versions thereof, other versions are possible. Therefore, the spirit and scope of the appended claims should not be limited to the description of the preferred versions contained therein.

I claim:

1. A time and attendance system for the high-speed recording of time information for a plurality of users, said time and attendance system comprising:

a plurality of user identification documents, one for each user of a plurality of users, each said user identification document having a bar code containing information uniquely identifying said user;

a base;

an upper container oriented above said base;

a support connecting said upper container to said base;

at least one user input means fixedly mounted in said upper container for reading said bar code to obtain said identification information on each said user identification document when each said user identification document is passed through a predetermined three-dimensional scanning region, said three-dimensional scanning region providing a guide for said plurality of user identification documents, said three-dimensional scanning region comprising:

said base, said base having an upper surface:

a column extending vertically from said base, said column having a vertically inclined arcuate surface;

said upper container connected atop said column and having a lower surface facing said upper surface of said base;

a reading means contained in said upper container;

a card fixedly attached to said upper surface of said base; and an aperture in said lower surface of said upper container of said user input means through which said reading means projects a beam of laser light;

said three-dimensional scanning region being a region formed by the projection of said laser beam, the base of said region bounded inferiorly by said upper surface of said base and the apex of said region formed by said aperture; and a host computing means connected to said at least one user input means for processing said user identification information, said host computing means comprising (a) display means for displaying information corresponding to said user identification information;

(b) storing means for storing said user identification information;

(c) a database contained in said storing means for retaining a record of each time and date of each said user attendance as said user passes said corresponding user identification document through said predetermined three-dimensional scanning region; and (d) means connected to said at least one user input means for transferring said user identification information from said at least one user input means to said host computing means;

said host computing means coupled to said transfer means and said storing means for processing said user identification information received from said at least one user input means through said transfer means, storing said user identification information in said database contained in said storing means, and transferring said identification information to said display means.

2. The time and attendance system of claim 1, wherein said user identification document comprises a card, approximately 2 inches by 3.5 inches, with said bar code encoded on the face of said card.

3. The user identification card of claim 2, wherein said card further comprises a photograph of said user on the face of said card near said bar code.

4. The user identification card of claim 2, wherein said card further comprises information consisting of at least said user's name printed on the face of said card near said bar code.

5. The time and attendance system of claim 1, wherein said storing means comprises a read-only memory.

6. The time and attendance system of claim 1, wherein said transfer means comprises a serial port.

7. The time and attendance system of claim 1, wherein said host computing means periodically requests validated identification and time and date information to be sent from said at least one user input means and wherein said at least one user input means comprises:

means for reading said bar code on said user identification document containing identification information corresponding to said user;

means for storing said read identification information corresponding to said user;

means for guiding said user identification document into said predetermined three-dimensional scanning region;

means for inputting optional identification information corresponding to said user;

means for providing current date and time information to said processing means;

processing means receptive of said read identification information from said reading means and of said current date and time from said providing means for transferring said stored identification information and said current time and date information to said storing means;

display means connected to said processing means; and means for providing validation signal to user upon successful reading of said user identification information;

said processing means, upon successful transfer of said stored identification information to said storing means, using said validation means to generate a validation signal to said user through said validation means and storing said current time and date in said storing means.

8. The time and attendance system of claim 7, wherein said means for storing identification information comprises a computer memory chip with a memory stack capable of storing a plurality of transactions.

9. The time and attendance system of claim 7, wherein said means for reading comprises a laser scanner capable of scanning said bar code on each said document.

10. The time and attendance system of claim 7, wherein said means for inputting optional identification information comprises a keypad.

11. The time and attendance system of claim 7, wherein said means for providing current date and time information comprises a digital clock.

12. The time and attendance system of claim 7, wherein said display means comprises a liquid crystal alphanumeric display (LCD).

13. The time and attendance system of claim 7, wherein said validation means comprises an audio speaker.

14. The time and attendance system of claim 7, wherein said validation means comprises a light.

15. A time and attendance system for the high-speed recording of time information for a plurality of users, said time and attendance system comprising:

a plurality of user identification documents, one for each user of a plurality of users, each said user identification document having a bar code containing information uniquely identifying said user;

a base;

an upper container oriented above said base;

a support connecting said upper container to said base;

at least one user input means fixedly mounted in said upper container for reading said bar code to obtain said identification information on each said user identification document when each said user identification document is passed through a predetermined three-dimensional scanning region formed by said base and said upper container, said three-dimensional scanning region providing a guide for said plurality of user identification documents;

a host computing means connected to said at least one user input means for processing said user identification information, said host computing means comprising (a) display means for displaying information corresponding to said user identification information;

(b) storing means for storing said user identification information;

(c) a database contained in said storing means for retaining a record of each time and date of each said user attendance as said user passes said corresponding user identification document through said predetermined three-dimensional scanning region;

(d) means connected to said at least one user input means for transferring said user identification information from said at least one user input means to said host computing means;

said host computing means coupled to said transfer means and said storing means for processing said user identification information received from said at least one user input means through said transfer means, storing said user identification information in said database contained in said storing means, and transferring said identification information to said display means;

said host computing means periodically requesting validated identification and time and date information to be sent from said at least one user input means and wherein said at least one user input means comprises:

means for reading said bar code on said user identification document containing identification information corresponding to said user;

means for storing said read identification information corresponding to said user:

means for guiding said user identification document into said predetermined three-dimensional scanning region, said guiding means comprising a three-dimensional scanning region, said three-dimensional scanning region comprising:

said base of said user input means, said base having an upper surface;

a column extending vertically from said base, said column having a vertically inclined arcuate surface;

said upper container connected atop said column and having a lower surface facing said upper surface of said base;

a reading means contained in said upper container;

a card fixedly attached to said upper surface of said base; and an aperture in said lower surface of said upper container of said user input means through which said reading means projects a beam of laser light;

said three-dimensional scanning region being a region formed by the projection of said laser beam, the base of said region bounded inferiorly by said upper surface of said base and the apex of said region formed by said aperture;

means for inputting optional identification information corresponding to said user:

means for providing current date and time information to said processing means;

processing means receptive of said read identification information from said reading means and of said current date and time from said providing means for transferring said stored identification information and said current time and date information to said storing means;

display means connected to said processing means; and means for providing validation signal to user upon successful reading of said user identification information;

said processing means, upon successful transfer of said stored identification information to said storing means, using said validation means to generate a validation signal to said user through said validation means and storing said current time and date in said storing means.

16. A time and attendance system for the high-speed recording of time information for a plurality of users, said time and attendance system comprising:

a plurality of user identification documents, one for each user of said plurality of users, each said user identification document having a bar code containing information corresponding to said user;

a base;

an upper container oriented above said base;

a support connecting said upper container to said base;

a user input means in said upper container for reading said bar code to obtain said user identification information on each said user identification document, said user input means comprising:

(a) means for storing said user identification information wherein said storing means comprises a computer memory chip with a memory stack capable of storing a plurality of transactions, (b) means for reading said user identification information comprising a laser scanner capable of scanning bar code information, (c) a predetermined three-dimensional scanning region near said reading means for placing said user identification document near said reading means to be read by said laser scanner, said three-dimensional scanning region providing a guide for said plurality of user identification documents, said three-dimensional scanning region comprising:

(i) said base, said base having an upper surface;

(ii) a column extending vertically from said base, said column having a vertically inclined arcuate surface;

(iii) said upper container connected atop said column and having a lower surface facing said upper surface of said base;

(iv) a card fixedly attached to said upper surface of said base; and (v) an aperture in said lower surface of said upper container of said user input means through which said reading means projects a beam of laser light;

said three-dimensional scanning region being a region formed by the projection of said laser beam, the base of said region bounded inferiorly by said upper surface of said base and the apex of said region formed by said aperture;

(d) means for inputting optional identification information comprising a keypad, (e) processing means receptive of said read user identification information for transferring said user identification information to said storing means, (f) means for providing current time and date information comprising a digital clock, and (g) display means comprised of a liquid crystal alphanumeric display (LCD), said processing means, upon successful transfer of said stored identification information to said storing means, generating a validation signal to said user, using said validation means, or validation information and storing said current time and date in said storing means; and a host computing means for processing said user identification information, said host computing means comprising:

(a) a second display means connected to said host computing means for display of information represented by said user identification information, (b) a second storing means connected to said host computing means for storing said user identification information, said second storing means comprising a read-only memory, (c) a database contained in said second storing means including records of times and dates of user attendance, and (d) a means connected to said user input means and said host computing means for transfer of said user identification information from said user input means to said host computing means, said host computing means coupled to said transfer means and said second storing means for processing said user identification information received from said user input means through said transfer means, storing said user identification information in said database contained in said second means, and transferring said user identification information to said second display means.

17. A method for recording time and attendance comprising the steps of:

forming a three-dimensional scanning region between a base and an upper container containing a bar code reading device, said three-dimensional scanning region comprising:

said base, said base having an upper surface;

a column extending vertically from said base, said column having a vertically inclined arcuate surface;

said upper container connected atop said column and having a lower surface facing said upper surface of said base;

a card fixedly attached to said upper surface of said base; and an aperture in said lower surface of said upper container through which said bar code reading device projects a beam of laser light;

said three-dimensional scanning region being a region formed by the projection of said laser beam, the base of said region bounded inferiorly by said upper surface of said base and the apex of said region formed by said aperture;

passing a document containing bar-coded information under said bar code reading device through said three-dimensional scanning region;

recording said bar-coded information contained on said document with said bar code reading device;

transmitting said bar-coded information from said bar code reading device to a digital processor;

transmitting said bar-coded information from said digital processor to a digital memory;

transmitting current time and date information stored in a clock to said digital processor;

transmitting said current time and date information from said digital processor to said digital memory; and transmitting a validation signal from said digital processor to a visual indicator and to an auditory indicator.

18. The method for recording time and attendance of claim 17, further comprising the steps of:

periodically sending a polling signal from a host computer to said digital processor;

in response to said polling signal, said digital processor retrieving all information stored in said digital memory;

said digital processor transmitting said information to said host computer; and said host computer storing said information in a database for subsequent analysis.

\* \* \* \* \*

UNITED STATES PATENT AND TRADEMARK OFFICE
CERTIFICATE OF CORRECTION

PATENT NO.  : 5,550,359
DATED       : AUGUST 27, 1996
INVENTOR(S) : BENNETT, Michael J.

It is certified that error appears in the above-indentified patent and that said Letters Patent is hereby corrected as shown below:

Drawing sheet 4 of 6, figure 5, change "150a" to --10a--.

Column 10, line 48, change ":" to --;--.

Column 13, line 5, change ":" to --;--.

Column 13, line 31, change ":" to --;--.

Signed and Sealed this

Eighteenth Day of March, 1997

Attest:

BRUCE LEHMAN

Attesting Officer

Commissioner of Patents and Trademarks